United States Patent
Kawai

(10) Patent No.: US 7,019,671 B2
(45) Date of Patent: Mar. 28, 2006

(54) IMAGE-TAKING APPARATUS AND MONITORING SYSTEM

(75) Inventor: Takashi Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 10/730,825

(22) Filed: Dec. 8, 2003

(65) Prior Publication Data

US 2004/0119821 A1 Jun. 24, 2004

(30) Foreign Application Priority Data

Dec. 18, 2002 (JP) .............................. 2002-366357

(51) Int. Cl.
*G08G 1/017* (2006.01)

(52) U.S. Cl. ........................ 340/937; 340/550; 348/59; 348/65

(58) Field of Classification Search ................ 340/937, 340/540, 541, 550, 980; 348/143, 144, 153, 348/158, 376, 59, 65; 345/7, 8

See application file for complete search history.

(56) References Cited

U.S. PATENT DOCUMENTS

| 5,793,419 A * | 8/1998 | Fraley ......................... 348/143 |
| 6,181,381 B1 * | 1/2001 | Evans .................... 348/333.01 |
| 6,278,480 B1 * | 8/2001 | Kurahashi et al. ............ 348/59 |
| 6,563,532 B1 * | 5/2003 | Strub et al. .................. 348/158 |
| 6,577,234 B1 * | 6/2003 | Dohrmann .................. 340/540 |
| 6,825,875 B1 * | 11/2004 | Strub et al. ............ 348/207.99 |

FOREIGN PATENT DOCUMENTS

JP 2001-128149 5/2001

\* cited by examiner

*Primary Examiner*—Van T. Trieu
(74) *Attorney, Agent, or Firm*—Morgan & Finnegan, L.L.P.

(57) ABSTRACT

An image-taking apparatus is disclosed which is easy to use and is capable of a search for a person or walking support without fail. The image-taking apparatus comprises a compound eye optical unit, an image-pickup device which photoelectrically converts an object image formed by the compound eye optical unit, and a transmission unit which transmits image information provided by using the image-pickup device. The compound eye optical unit and the image-pickup device are held by a hold member which is provided with an attachment member for attachment to a user.

12 Claims, 8 Drawing Sheets

100(101, 108)

103

601

100(101, 108)

115

FIG.9
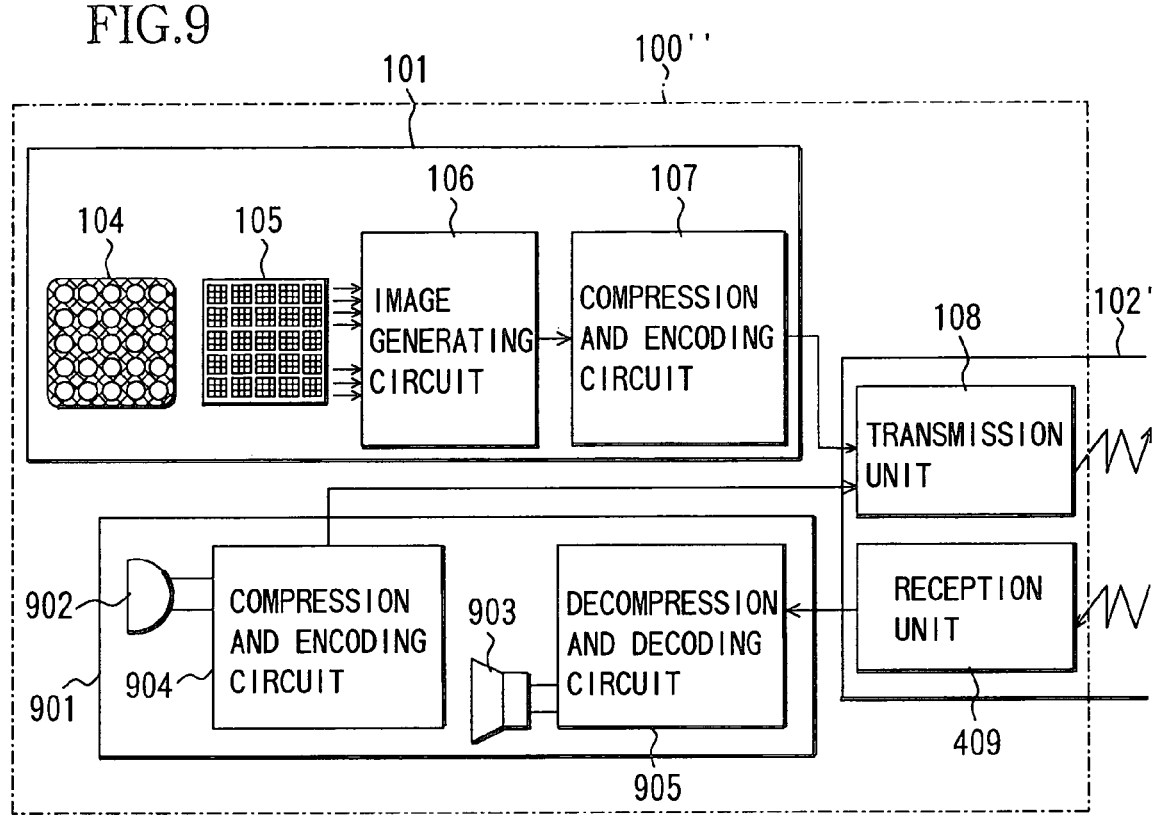
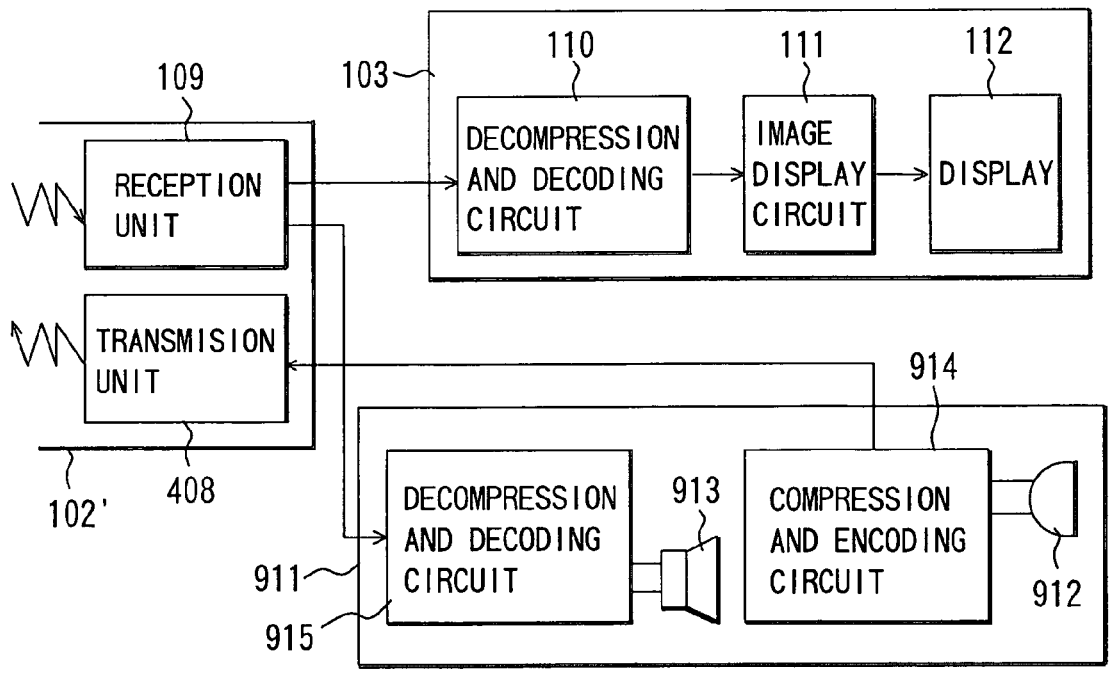

IMAGE-TAKING APPARATUS AND MONITORING SYSTEM

BACKGROUND OF THE INVENTION

1. Field of the Invention

The present invention relates to an image-taking apparatus which uses an image-pickup device to take image information and to a monitoring system which uses the image-taking apparatus.

2. Description of Related Art

Locating service which uses the GPS (Global Positioning System) has been provided as aid service for lost children, wandering demented elderly people, and visually handicapped people.

This is service in which a person to be aided such as a child or an elderly person carries a GPS terminal (such as a dedicated terminal or a cellular phone having a GPS function) and the current position of the person is determined on the basis of the positions of GPS satellites and the time to rescue him/her.

Only the use of the GPS or the like to take positional information, however, cannot provide knowledge about circumstances surrounding the person to be aided. Specifically, the aforementioned service has a problem that it is not possible to determine from the positional information on a map whether or not the person to be aided is in a situation in which he/she needs emergent help or whether or not he/she is at a position which can be easily found.

To address this, Japanese Patent Application Laid-Open No. 2001-128149 has proposed a system which is particularly suitable for walking support of visually handicapped people by using an image-taking apparatus such as a video camera and a PHS terminal in order to eliminate the aforementioned disadvantage of the aid system which only takes positional information with the GPS or the like. The patent has proposed a support system in which a visually handicapped person carries an image-taking apparatus such as a video camera to transmit taken image to a support center where an operator provides walking guidance with his/her voice while seeing an image monitor installed therein, as well as a walking guidance support system which utilizes the determination of the current position through the GPS and guidance by an operator in a support center.

The aforementioned patent has proposed Embodiment 1 employing a PHS terminal provided with a video camera in which the video camera and the PHS terminal are formed into an integral unit to allow a user (a visually handicapped person) to take image over a wide area by moving the terminal in front-to-back and right-to-left directions. The patent also has proposed Embodiment 2 in which a video camera and a PHS terminal are separately formed and the video camera is connected to the PHS terminal through a cable to allow a user to take image by the video camera hung from his/her neck.

In Embodiment 1 therein, however, the user can take image only by moving the PHS terminal with the video camera in front-to-back and right-to-left directions. Thus, it is not suitable for use by a lost child (especially an infant) or a wandering elderly person.

In Embodiment 2, the handling of the cable is cumbersome when the video camera is hung from his/her neck. Especially for an infant, the video camera and the cable hung from his/her neck interfere with the movement of his/her body, so that he/she may take off the video camera from his/her body or disconnect the cable to make normal operation of the system impossible.

Both when a visually handicapped person uses the system and when a lost child or a wandering elderly person uses the system, the system proposed in the aforementioned patent must have, in the image-taking apparatus, a so-called super wide-angle (fish-eye) lens which allows image taking at a wide field angle corresponding to the visual field of both eyes of a human (generally, 60 degrees in the vertical direction and at least 120 to 160 degrees in the horizontal direction) in order to effectively function the system.

As shown in FIG. 10, however, such a super wide-angle lens 1000 is formed of as much as 8 lens units, and thus very heavy and considerably large in lens length. As a result, the system proposed in the aforementioned patent is likely to be inappropriate for actual use.

SUMMARY OF THE INVENTION

It is an object of the present invention to provide an image-taking apparatus which is easy to use and is capable of a search for a person or walking support, and a monitoring system which uses the image-taking apparatus.

To achieve the object, according to one aspect of the present invention, an image-taking apparatus comprises a compound eye optical unit which has a plurality of optical elements each facing to an object and having an image-forming action, an image-pickup device which photoelectrically converts an object image formed by the compound eye optical unit, a transmission unit which transmits image information provided by using the image-pickup device. The compound eye optical unit and the image-pickup device are held by a hold member which is provided with an attachment member for attachment to a user.

According to another aspect of the present invention, a monitoring system comprises the image-taking apparatus and a monitor apparatus which displays image information transmitted from the transmission unit of the image-taking apparatus.

These and other characteristics of the image-taking apparatus and the monitoring system according to the present invention will be apparent from the following description of specific embodiments with reference to the drawings.

BRIEF DESCRIPTION OF THE DRAWINGS

FIG. 9 is a block diagram showing the structure of a remote monitoring system using an image-taking apparatus which is Embodiment 3 of the present invention.

DETAILED DESCRIPTION OF THE PREFERRED EMBODIMENTS

Preferred embodiments of the present invention are hereinafter described with reference to the drawings.

(Embodiment 1)

Figure 1:
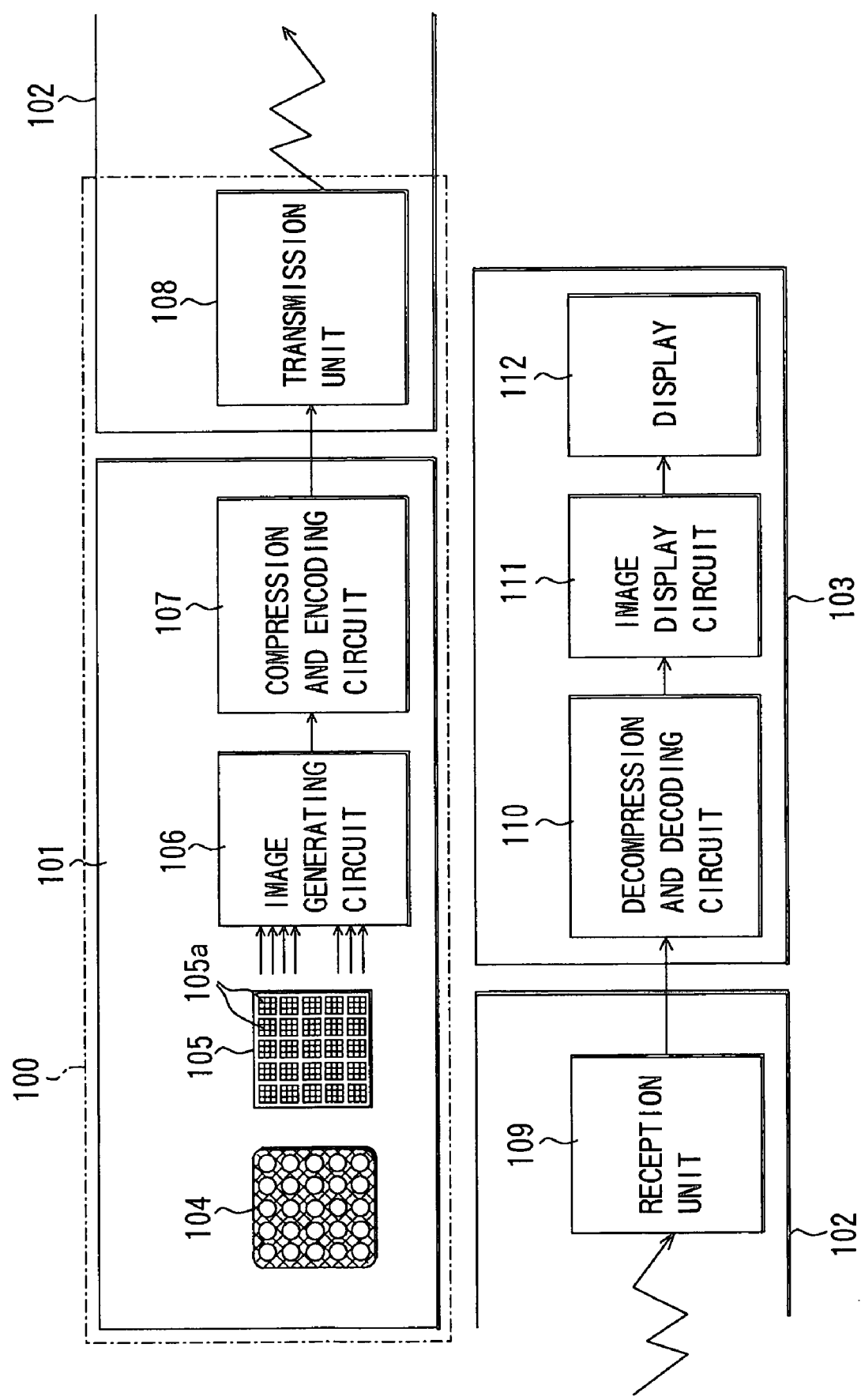
FIG. 1 is a block diagram showing the structure of a remote monitoring system using an image-taking apparatus which is Embodiment 1 of the present invention.

FIG. 1 is a block diagram showing the structure of a remote monitoring system which is Embodiment 1 of the present invention.

The remote monitoring system of Embodiment 1 employs an image-taking apparatus 100 having a compound eye image-pickup unit 101 which uses a compound eye optical device to take image at a wide field angle and a transmission unit 108.

The compound eye image-pickup unit 101 has a compound eye optical unit 104 which has a plurality of lenses arranged so as to juxtapose to each other in a matrix-like form. Each of the lenses faces to an object (not shown) and has an action of forming luminous flux from the object into an image. The compound eye image-pickup unit 101 also has an image-pickup device 105 as a photoelectrical conversion element which photoelectrically converts an object image formed by each lens of the compound eye optical unit 104. The unit 101 also has an image generating circuit 106 which produces a digital image signal from an electric signal output from the image-pickup device 105, and a compression and encoding circuit 107 which compresses and encodes data in order to transmit the digital image signal generated by the image generating circuit 106.

Figure 2:
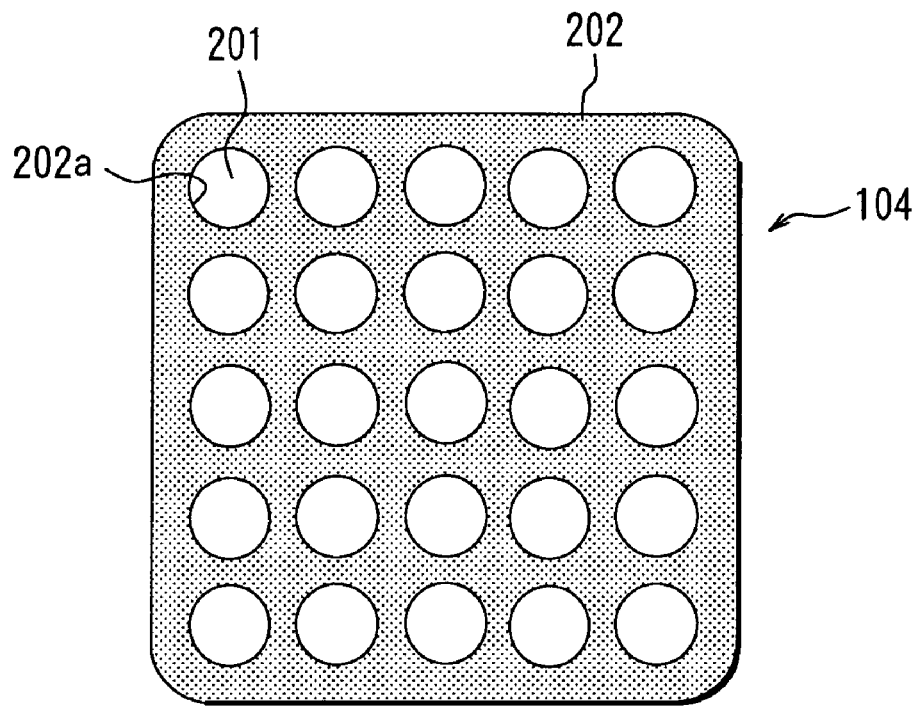
FIG. 2 shows a compound eye optical unit forming part of the image-taking apparatus of Embodiment 1 from the front.
Figure 3:
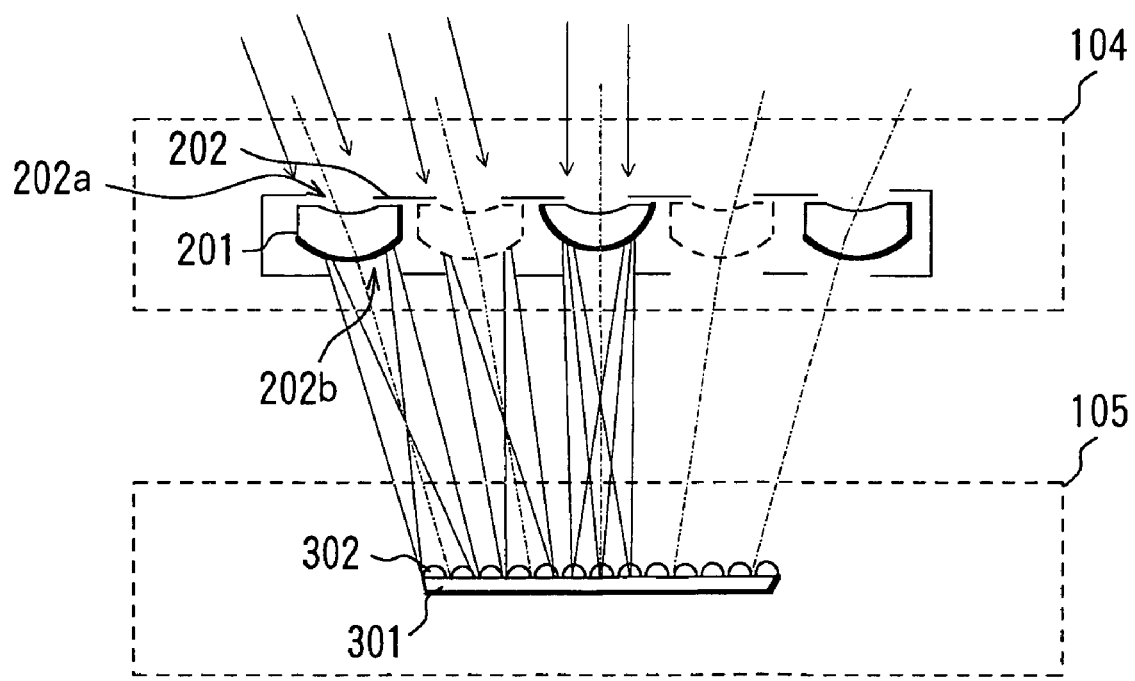
FIG. 3 is a cross section of the compound eye optical unit and an image-pickup device of Embodiment 1.

Description is now made for the compound eye optical unit 104 and the image-pickup device 105 in detail. FIG. 2 shows the compound eye optical unit 104 viewed from the object (the front). FIG. 3 shows the compound eye optical unit 104 and the image-pickup device 105 from the side.

The compound eye optical unit 104 is formed in a generally a flat shape and of a plurality of single lenses 201 arranged in a matrix-like form (a total of 25 lenses with 5 rows and 5 columns in Embodiment 1) and a lens support member 202 which is made of plastic or the like to provide a light shielding function and supports the plurality of lenses 201. Each of the lenses 201 is a single lens. Openings 202a for passing luminous flux from the object are formed in portions of the lens support member 202 in the front surface (the top surface in FIG. 3) which face the front surfaces of the respective lenses 201. The openings 202a serve as stops.

In FIG. 3, the direction of the optical axis of the lens 201 (shown by a dash dotted line) placed at the center of the compound eye optical unit 104 matches the normal to the image-pickup device 105. A lens 202 placed at a larger distance from the center has its optical axis at a larger angle with respect to the optical axis of the central lens 201 such that the optical axis extends outward.

The central lens 201 is formed to have the optical axis on the incident side matching the optical axis on the emerging side. Thus, the optical axis on the emerging side of the central lens 201 is perpendicular to the image-pickup device 105 disposed in parallel with the compound eye optical unit 104.

On the other hand, an outer lens 201 away from the center is formed such that the optical axis on the incident side is refracted to cause the optical axis on the emerging side to extend in a direction close to the perpendicular direction to the image-pickup device 105. Such a structure of the compound eye optical unit 104 can provide a wide visual field angle (a wide field angle for image taking) while it is formed in a compact size.

Openings 202b are formed in the rear surface (the bottom surface in FIG. 3) of the lens support member 202 through which luminous flux through the respective lenses 201 pass. The opening 202b associated with the aforementioned central lens 201 is formed to face the rear surface of the central lens 201. However, openings 202b associated with the outer lenses 201 are disposed at inner positions with respect to the positions facing those lenses 201 in accordance with the inclinations of the optical axes on the emerging side (the inclinations after the refraction) of the lenses 201.

The image-pickup device 105 has a photoelectrical conversion element 301 which is formed of a CCD or a CMOS sensor and microlenses 302 which converge light to each pixel of the photoelectrical conversion element 301. As shown in FIG. 1, photoelectrical conversion areas 105a are formed on the photoelectrical conversion element 301, the number of which is the same as the number of the single lenses 201 (25 in Embodiment 1). One photoelectrical conversion area 105a photoelectrically converts an object image formed by one lens 201 associated therewith. In other words, an object image over the entire visual field of the compound eye optical unit 104 is taken in separate parts by a plurality of image-pickup systems each formed of one lens 201 and one photoelectrical conversion area 105a.

Luminous flux from the object shown by each arrow in FIG. 3 passes through each opening 202a and 202b of the lens support member 202 and each lens 201, is collected by each microlens 302, and forms an image on a light-receiving surface (pixel) of each photoelectrical conversion area 105a on the photoelectrical conversion element 301. Since the lenses 201 have the optical axes inclined with respect to each other and form individual visual field images on the light-receiving surface of the photoelectrical conversion element 301, an image of the entire visual field can be taken without any portion left.

Description is now made for specifications to be required of the compound eye optical unit 104. The image-taking apparatus 100 is a substitute for eyes of a person (a user) who carries the apparatus. Especially when a lost child or a wandering elderly person is searched for, or when a visually handicapped person is supported in walking, it is more important to allow instant understanding of the environment over a wide area surrounding the carrier than to observe part of the environment surrounding the carrier in detail. It is necessary to at least take an image over the visual field area which can be normally recognized by both eyes of a human from the front of the carrier.

Generally, it is said that the visual field area of both eyes of a human is equal to 60 degrees in the vertical direction and 120 to 160 degrees in the horizontal direction. Thus, the number and the inclinations of the optical axes of the lenses 201 arranged in the compound eye optical unit 104 are determined to enable image taking at a wide field angle of at least approximately 120 to 160 degrees in the horizontal direction.

An object image formed by the compound eye optical unit 104 as described above is converted into an electrical signal in accordance with the reflectivity of the object by the photoelectrical conversion element 301 and sent to the image generating circuit 106.

Next, the image generating circuit 106 is described. The electrical signal output from the image-pickup device 105 is an analog electrical signal in accordance with the amount of light exposure with the luminous flux from the object. The analog electrical signal is subjected to amplification by a gain amplifier in an analog image generating circuit, not shown, sample and hold, and analog/digital conversion by an A/D converter. In addition, the separate visual field images taken independently through the respective single lenses 201 and the respective photoelectrical conversion areas 105a are subjected to correction of aberration such as distortion and then combination and coupling to generate a digital image signal (image information) which represents one object image as a whole.

In addition, the image generating circuit 106 has circuits which perform various types of processing for characterizing image quality, such as AE processing for automatically adjusting brightness of an image, AWB processing for automatically performing white balance adjustment, and digital filtering for adjusting sharpness of an image.

The digital image signal thus generated is subjected to data compression and encoding processing in the compression and encoding circuit 107 for transmission. Various schemes of the compression and encoding of image signals exist at present, and no particular limitation is imposed on the encoding scheme in the present invention. However, it is preferable to employ a scheme in which high compression and encoding is performed with image quality maintained to enable image transmission at a low bit rate. For such an image compression and encoding scheme, representative schemes as international standards may be used including MPEG-4 or H263 as a compression and encoding scheme for moving images and Motion JPEG or Motion JPEG2000 as a compression and encoding scheme based on a still image, or a proprietary scheme may be used.

As described above, in the image-taking apparatus 100 of Embodiment 1, the compound eye image-pickup unit 101 forms an object image over a wide visual field (an image-taking area) by the compound eye optical unit 104, photo-electrically converts the image in the image-pickup device 105, generates a digital image signal from the obtained image signal, and compresses and encodes the signal.

Next, description is made for a radio communication system 102 provided in the monitoring system of Embodiment 1 of the present invention with reference to FIG. 1.

The communication system 102 is formed of a transmission unit 108 which is carried by a user and transmits the image signal compressed and encoded by the compound eye image-pickup unit 101 and a reception unit 109 which is placed on the side of a monitor and receives the transmitted image signal.

The transmission scheme employed in the communication system 102 is not limited particularly. It is desirable to select a radio communication scheme which utilizes Wireless LAN or IMT-2000 in consideration of the transmission range.

Since the transmission unit 108 is carried by a human, Embodiment 1 is described with Bluetooth® taken as an example due to its characteristic of power saving.

Bluetooth® achieves communication through frequency hopping spread spectrum communication at a radio frequency of 2.4 GHz, basically follows primary modulation, spread modulation, transmission, reception, despread, and information demodulation which are performed in the spread spectrum, and employs GFSK in the primary modulation and the frequency hopping scheme in the spread modulation.

Since Bluetooth® has the characteristic of power saving as described above, it is an effective scheme for a portable device due to less battery drain. It is originally suitable for system operation in a relatively small area due to its low output and a short distance which radio waves reach. However, system operation in a large area is also possible by using Bluetooth®. How to achieve such system operation is described later.

The reception unit 109 transmits the received image signal to a monitor apparatus 103. The monitor apparatus 103 decompresses and decodes the compressed and encoded image signal received from the reception unit 109 in a decompression and decoding circuit 110 through inverse operation of the aforementioned compression and encoding to convert the signal into an image signal which can be visualized. The decompressed and decoded image signal is displayed on a display 112 through an image display circuit 111. This allows a monitoring person in front of the display 112 to view, as an image, the circumstances in a wide area surrounding the carrier of the image-taking apparatus 100.

The monitor apparatus 103 is not limited to a fixed apparatus formed of a personal computer and a CRT display, and a portable apparatus may be used which can receive an image signal, decompress and decodes it, and displays it as an image, such as a cellular phone or a PDA.

Figure 4:
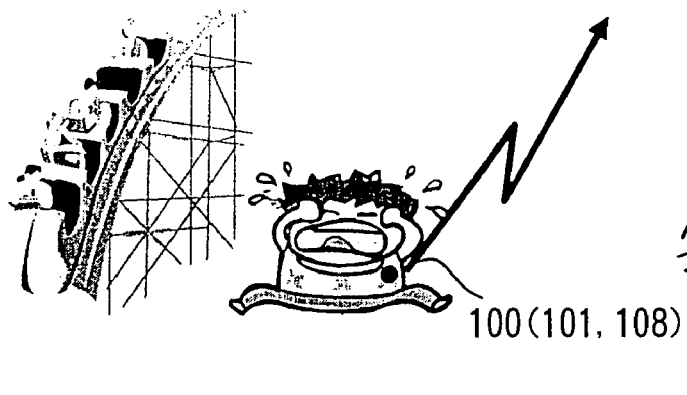
FIGS. 4(A) and 4(B) show an example of operation of the monitoring system of Embodiment 1.
Figure 4:
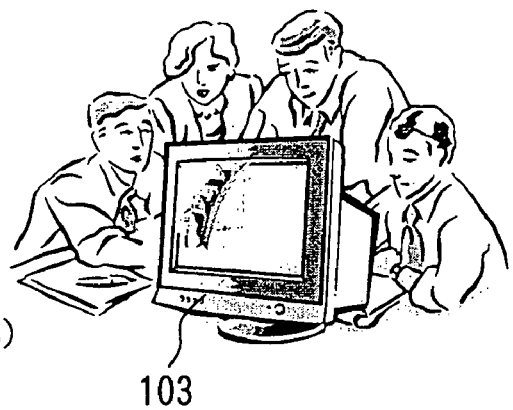

Next, description is made for an example of operation of the aforementioned monitoring system. FIG. 4 shows an example of system operation in a situation in which a child is lost in an amusement park.

FIG. 4(A) shows a child wearing on his/her clothing the image-taking apparatus 100 which is formed in a badge type by mounting the compound eye image-pickup unit 101 and the transmission unit 108 on a hold member in a badge shape. He/She is lost and confused.

A roller coaster is present in front of the child. The image-taking apparatus 100 (compound eye image-pickup unit 101) is taking an image of the entire roller coaster including tracks and trains thereof by using the function to take an image over a wide visual field area.

The image signal representing the scene in front of the child taken by the compound eye image-pickup unit 101 is transmitted by the transmission unit 108 to the reception unit 109 placed in a lost child center in the amusement park shown in FIG. 4(B) and displayed on a display 112 of the monitor apparatus (a personal computer) 103 installed in the lost child center. The parents of the lost child and a staffman of the lost child center see the displayed image. Since the entire roller coaster is shown on the display, they can immediately know that the child is at the position where the image can be taken.

Figure 5:
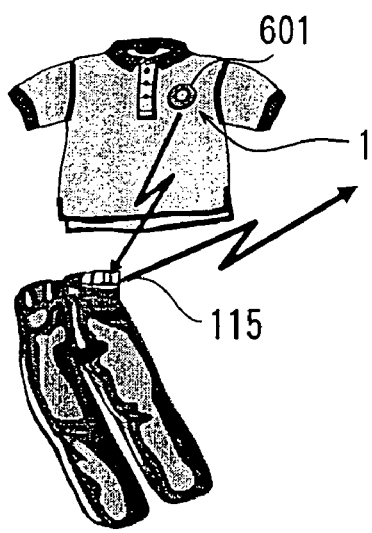
FIGS. 5(A) and 5(B) show an example of attachment of the image-taking apparatus of Embodiment 1 formed in a badge shape.
Figure 5:
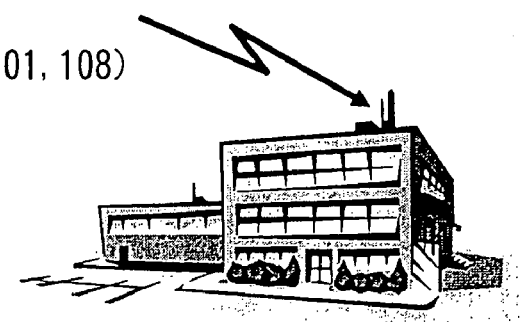
Figure 6:
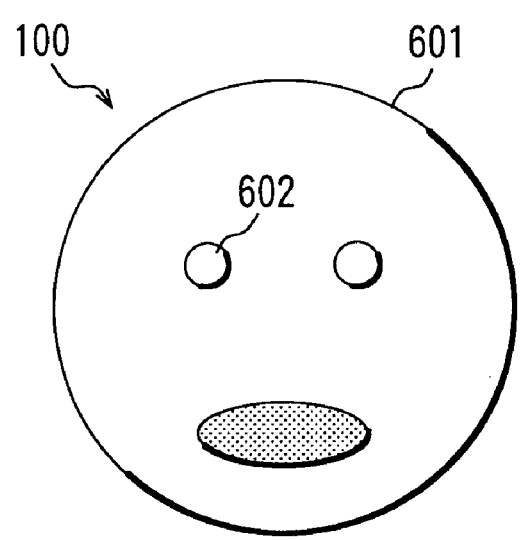
FIGS. 6(A) and 6(B) show the structure of the badge-type image-taking apparatus.
Figure 6:
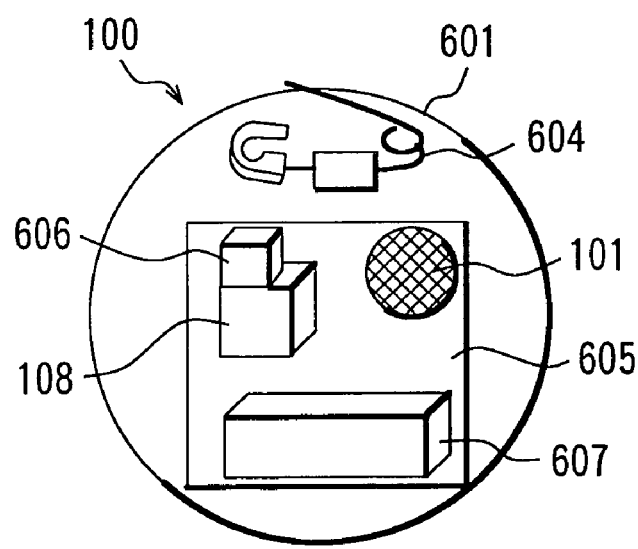

Description is now made for an effective manner of system operation in the wide amusement park when a transmission unit of a low output type such as Bluetooth® is used as a transmission scheme of image signals with reference to FIGS. 5 and 6.

FIG. 5(A) and FIGS. 6(A) and 6(B) show image-taking apparatus 100 comprising the compound eye image-pickup unit 101 and the transmission unit 108 of the low output type held in a hold member 601 in a badge shape, as shown in FIG. 4(A). FIGS. 6(A) and 6(B) show the structure of the front surface and the back surface of the image-taking apparatus in the badge shape.

As shown in FIG. 6(B), the compound eye image-pickup unit 101 and the transmission unit 108 are held on the back surface of the hold member 601. As shown in FIG. 6(A), the hold member 601 has an opening 602 which allows the compound eye image-pickup unit 101 to take an image over a visual field area facing the front surface of the hold member 601. While various patterns may be provided by printing or the like on the front surface of the hold member 601, a face of a popular character is drawn on the front surface of the hold member 601 in Embodiment 1, and the opening 602 is formed at the position of one of the eyes of the character.

On the other hand, a safety pin 604 for securing the hold member 601 to the user's clothing (preferably clothing on an upper body) and a circuit substrate 605 are held on the back surface of the hold member 601. Mounted on the circuit substrate 605 is the compound eye image-pickup unit 101, the transmission unit 108, a chip antenna 606, and a battery 607 serving as the power source thereof.

The safety pin 604 in contact with the clothing is disposed in an upper portion of the hold member 601 and the heavy battery 607 is disposed in a lower portion of the hold member 601 to ensure stability when the hold member 601 is secured to the clothing. All the parts of the image-taking apparatus 100 including the compound eye image-pickup unit 101 are arranged in a flat shape to provide a small thickness as a whole. This can maintain a stable position even when the body moves, so that images can be taken with less vibration.

Reference numeral 115 shown in FIG. 5(A) shows a relay communication unit put on clothing (preferably clothing on a lower body such as a waist belt). The relay communication unit 115 receives an image signal from the transmission unit 108 and converts it into a signal for a radio communication scheme which supports a general public communication network of higher power such as IMT-2000 as compared with a radio communication scheme of a low output type such as Bluetooth®. The relay communication unit 115 transmits the converted image signal to the lost child center in the amusement park shown in FIG. 5(B) or a security company outside the park. An image signal is sent from outside the park to the lost child center through a dedicated channel or a general public communication network.

As described above, the child wears the hold member 601 (the image-taking apparatus 100) provided with the battery 607 which is relatively light and small in capacity on his/her upper body and the relay communication unit 115 provided with a relatively heavy battery with large capacity on his/her lower body such as his/her waist, which can prevent his/her movement from being hindered as much as possible. Since the hold member 601 (the communication unit 108) is not connected to the relay communication unit 115 through a cable, no cable is put on his/her body and he/she can wear these units without uncomfortableness.

In addition, the transmission unit 108 (the image-taking apparatus 100) put on the carrier at a position near his/her chest or head has low output, and the relay communication unit 115 of high output is put on the carrier such as his/her waist away from the head or the like. This can prevent an ill effect due to radio waves on his/her body.

(Embodiment 2)

Figure 7:
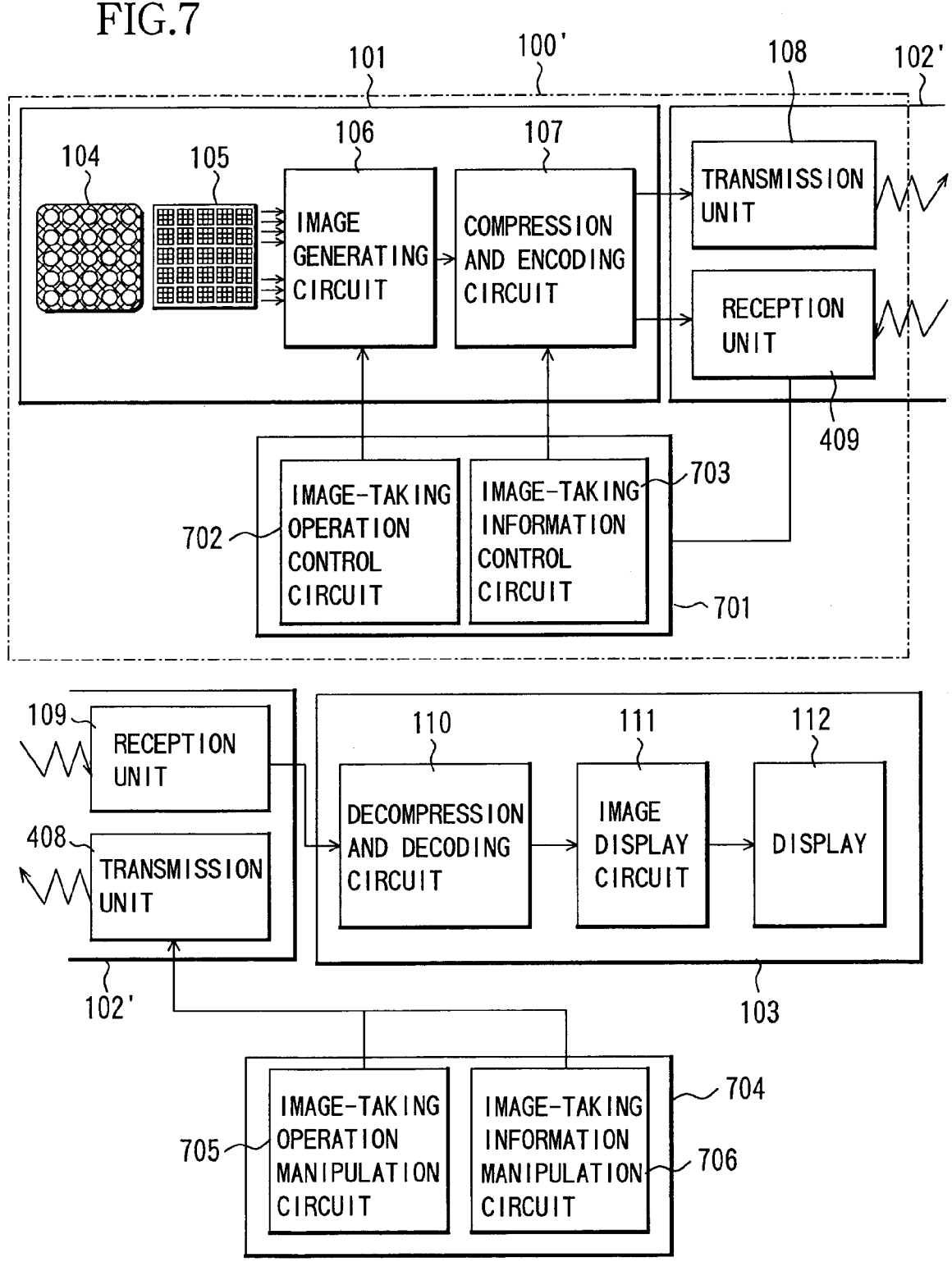
FIG. 7 is a block diagram showing the structure of a remote monitoring system using an image-taking apparatus which is Embodiment 2 of the present invention.

FIG. 7 shows the structure of a remote monitoring system which is Embodiment 2 of the present invention. It should be noted that, in Embodiment 2, components identical to those in Embodiment 1 are designated with the same reference numerals as those in Embodiment 1 to omit description thereof.

An image-taking apparatus 100' used in the system of Embodiment 2 has an image-taking control circuit 701, later described, added to the image-taking apparatus 100 described in Embodiment 1 and also has a manipulation apparatus 704 on the side of a monitor apparatus 103. In addition, in a communication system 102', a reception unit 409 is added to the side of the image-taking apparatus 100' and a transmission unit 408 is added to the side of the monitor apparatus 103 in the communication system of Embodiment 1.

The image-pickup control circuit 701 on the side of the image-taking apparatus 100' is formed of an image-taking operation control circuit 702 which performs control concerning image-taking operation and an image-taking information control circuit 703 which controls an amount of taken image information.

The manipulation apparatus 704 is formed of an image-taking operation manipulation circuit 705 which outputs a manipulation signal (an operation manipulation signal) concerning image-taking operation in accordance with manipulation of manipulation members such as buttons or sticks, not shown, and an image-taking information manipulation circuit 706 which outputs a manipulation signal (an information amount manipulation signal) for manipulating an amount of taken image information.

The system is normally in a standby state in which a compound eye image-pickup unit 101 in the image-taking apparatus 100' performs no image-taking operation and only the communication system 102' operates to wait for a manipulation signal from the manipulation apparatus 704.

When a child is lost (notification is made from parents or the like), a staffman in a lost child center manipulates the manipulation member provided for the image-taking operation manipulation circuit 705 of the manipulation apparatus 704. This causes the image-taking operation manipulation circuit 705 to transmit an image-taking start signal which is one of operation manipulation signals to the reception unit 409 on the side of the image-taking apparatus 100' through the transmission unit 408.

Upon reception of the image-taking start signal through the reception unit 409, the image-taking control circuit 701 of the image-taking apparatus 100' carried by the lost child starts image-taking operation of the compound eye image-pickup unit 101 in response to the signal. This allows an image of the scene in front of the child to be displayed on a display 112 of the monitor apparatus 103 in the lost child center.

In this manner, the image-taking control circuit 701 and the manipulation apparatus 704 are used to take an image only when required, thereby making it possible to reduce a waste of a battery 607.

In addition, manipulation of the manipulation member provided for the image-taking operation manipulation circuit 705 can instruct the image-taking apparatus 100' to stop image-taking or continue image-taking.

The staffman of the lost child center manipulates the manipulation member provided for the image-taking information manipulation circuit 706 in accordance with the environment surrounding the lost child known from the image displayed on the monitor apparatus 103. The image-taking information manipulation circuit 706 transmits an information amount manipulation signal to the reception unit 409 on the side of the image-taking apparatus 100' through the transmission unit 408 in accordance with the manipulation of the manipulation member. In this manner, the state of the image transmitted from the image-taking apparatus 100' can be adjusted.

Specifically, in a limited data communication environment, adjustments are made such that the compressibility of image information is increased to give high priority on smoothness as moving images while image quality is reduced, or adjustments are made such that the compressibility of image information is reduced to give high priority on image quality while smoothness as moving images is reduced. The former adjustments are made, for example, when the constantly changing position of the lost child needs to be known in real time. The latter adjustments are made, for example, when the lost child remains at one position and the staffman wants to see images at high resolution to know the detailed environment surrounding the child.

Upon reception of the information amount manipulation signal from the image-taking information manipulation circuit 706, the image-taking information control circuit 703 on the side of the image-taking apparatus 100' controls the compressibility of the image signal through the compression and encoding circuit 107. For example, when moving images are compressed and encoded in MPEG-4, a scalability function is provided in space and time in accordance with the transmission environment, and the image-taking information control circuit 703 can use the scalability function to achieve optimal image transmission.

Also, in compression and encoding in JPEG which is a compression and encoding scheme based on a still image, an image information amount can be controlled by controlling a parameter called the Q value.

(Embodiment 3)

Figure 8:
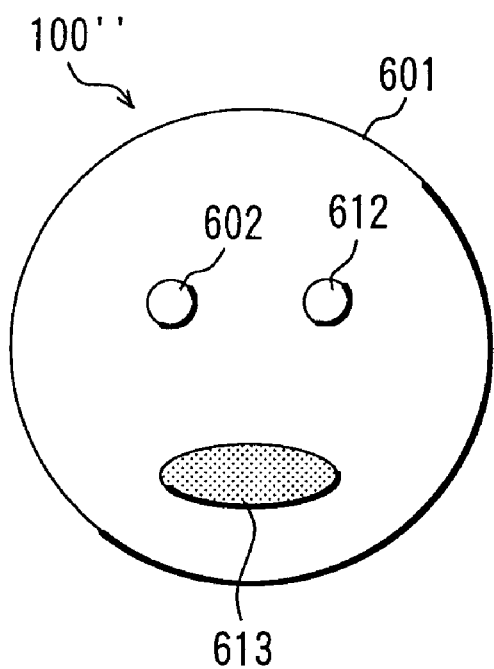
FIGS. 8(A) and 8(B) show the structure of the image-taking apparatus in a badge shape of Embodiment 2.
Figure 8:
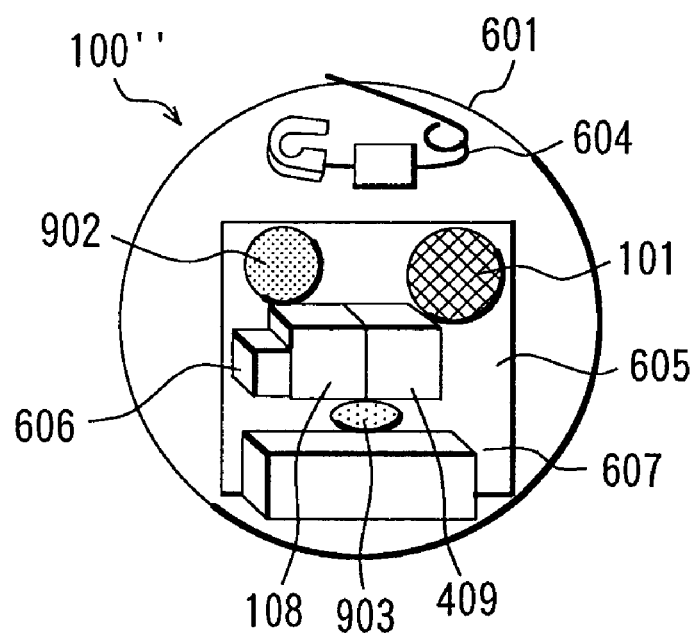
Figure 10:
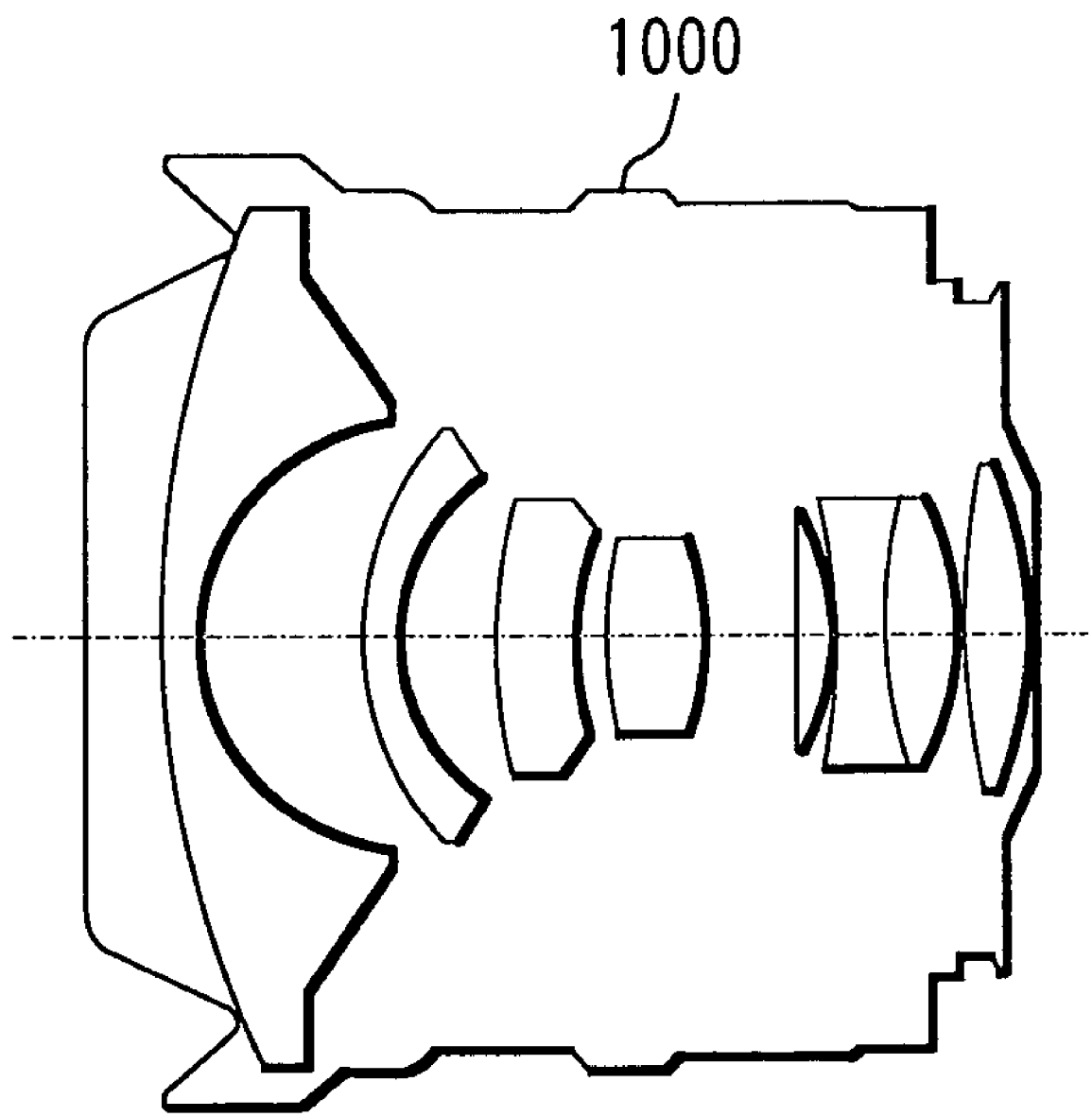
FIG. 10 is a section view showing the structure of a conventional super wide-angle (fish-eye) lens.

FIGS. 8(A) and (B) show the structure of an image-taking apparatus which is Embodiment 3 of the present invention. FIG. 9 shows the structure of a remote monitoring system which has the image-taking apparatus 100". The image-taking apparatus 100" of the embodiment has a voice input/output unit 901 including a microphone 902 and a speaker 903 added to the image-taking apparatus 100 described in Embodiment 1, and also has a voice input/output unit 911 including a microphone 912 and a speaker 913 on the side of the monitor apparatus 103 described in Embodiment 1. A communication system 102' is identical to the counterpart described in Embodiment 2. In Embodiment 3, components identical to those in Embodiments 1 and 2 are designated with the same reference numerals as those in Embodiments 1 and 2 to omit description thereof.

FIGS. 8(A) and 8(B) show the structures of the front surface and the back surface of the image-taking apparatus 100" formed in a badge shape. In Embodiment 3, the microphone 902, the speaker 903, and a reception unit 409 are mounted on a circuit substrate 605 held on the back surface of a hold member 601 together with a compound eye image-pickup unit 101, transmission unit 108 and battery 607. A safety pin 604 is held on the back surface of the hold member 601.

As shown in FIG. 8(A), in the hold member 601, an opening 612 is formed for picking up voice by the microphone 902 at the position of an eye of a popular character drawn on the front surface of the hold member 601 (the position of the eye different from the eye at which the opening 602 is formed for image-taking by the compound eye image-pickup unit 101 described in FIG. 6(A)). In addition, an opening 613 is formed for utterance by the speaker 903 at the position of the mouth of the character in the hold member 601.

In FIG. 9, in the voice input/output unit 901 on the side of the image-taking apparatus 100", voice information taken by the microphone 902 is compressed and encoded by the compression and encoding circuit 904 for voice, multiplexed with an image signal by a transmission unit 108, and transmitted to a reception unit 109 on the side of the monitor apparatus 103. The image signal and the voice signal received by the reception unit 109 are separated there. The separated voice signal is decompressed and decoded by a decompression and decoding circuit 915 for voice and output as voice from the speaker 913. This allows a staffman or the parents at the lost child center to hear the voice of the child or the surrounding sound as well as see the image of the scene around the lost child.

On the other hand, in the voice input/output unit 911 on the side of the monitor apparatus 103, voice information taken by the microphone 912 is compressed and encoded by the compression and encoding circuit 914 for voice and transmitted by a transmission unit 408 to the reception unit 409 on the side of the image-taking apparatus 100". The voice signal received by the reception unit 409 is decompressed and decoded by a decompression and decoding circuit 905 for voice and output as voice from the speaker 903. This allows the parents or the like at the lost child center to call the lost child to provide emotional support.

While no particular limitation is imposed on the compression and encoding scheme and the decompression and decoding scheme for voice, CELP or HVXC which belongs to a classification called a speech codec is generally suitable.

(Embodiment 4) In the monitoring systems of Embodiment 1 to Embodiment 3 described above, the GPS function may be provided for the relay communication unit 115 shown in FIG. 5(A) to use both of positional information about the carrier and image information about the scene surrounding the carrier.

With this structure, it is possible to take positional information on a map about a carrier such as a lost child or a wandering demented elderly person especially in a wide area such as an urban district and to obtain detailed image information about the scene surrounding the carrier.

While each of Embodiments 1 to 3 has been described for a case where the image-taking apparatus is formed in the badge type (the badge shape) including the hold member formed in a circular shape, the hold member may have various shapes such as a square or a star. In addition, the image-taking apparatus may have any form as long as it can be put on a body. For example, the image-taking apparatus may take a buckle form, a card form for hanging from a user's neck, or a button form by taking advantage of the small size and weight.

Furthermore, while each of Embodiments 1 to 3 has been described for a case where the single lenses in the compound eye optical unit are arranged in a flat shape, the single lenses may be arranged in a curved shape. In addition, while each of Embodiments 1 to 3 has been described for a case where the transmission unit (and reception unit) is held by the hold member, the transmission unit (and reception unit) may be separated from the hold member and attached individually on clothing of a user as the relay communication unit in Embodiment 1.

As described above, according to each of Embodiments 1 to 3, the compound eye optical unit can be used to monitor the surroundings of the carrier at the wide field angle while the image-taking apparatus has a small size (especially a small thickness) and weight. Thus, it is possible to reliably perform a search for a lost child or a wandering elderly person or walking support of a visually handicapped person without burdening the carrier.

Since the image-taking apparatus including the transmission unit can be put on a user as an integral component through the hold member, it is possible to avoid disadvantages such as a distribution cable interfering with movement of the user or the user disconnecting the distribution cable.

Even when the image-taking apparatus put on and carried by the user is vibrated, the image taken at the wide field angle can result in less vibration observed and thus an observer feels less fatigue.

In addition, the hold member has a shape with high portability such as a badge, button, buckle, card or the like to realize the image-taking apparatus which a child is willing to carry.

Furthermore, when control information can be transmitted from the monitor to the image-taking apparatus, it is possible to control image-taking operation or adjust image quality through remote manipulation from the reception side (the monitor side) of image information.

While preferred embodiments have been described, it is to be understood that modification and variation of the present invention may be made without departing from the scope of the following claims.

What is claimed is:

1. An image-taking apparatus comprising:
    a compound eye optical unit including a plurality of lenses each facing to an object and having an image-forming action;
    an image-pickup device having a plurality of photoelectrical conversion elements configured to photoelectrically convert an object image formed by the compound eye optical unit; and
    a transmission unit which transmits image information provided by the image-pickup device,
    wherein the plurality of lenses of the compound eye optical unit is designed in such a way that an optical axis of an outer lens away from a center lens is inclined outward with respect to the optical axis of the center lens.

2. The image-taking apparatus according to claim 1, wherein the transmission unit is held by the hold member.

3. The image-taking apparatus according to claim 1, wherein a lens of the plurality of lenses disposed at a larger distance from the center of the compound eye optical unit has an optical axis inclined more outward with respect to the optical axis of the center lens.

4. The image-taking apparatus according to claim 1, wherein the compound eye optical unit forms an image-taking field angle of 120 degrees or more in a predetermined direction.

5. The image-taking apparatus according to claim 1, wherein the hold member is attachable to a user's clothing.

6. The image-taking apparatus according to claim 1, wherein the hold member has a badge, button, buckle, or card shape.

7. The image-taking apparatus according to claim 1, further comprising: a reception unit which receives a control signal; and a controller which controls image-taking operation based on the control signal.

8. A monitoring system comprising:
    the image-taking apparatus according to claim 7;
    a monitor apparatus which displays image information transmitted from the transmission unit of the image-taking apparatus;
    a monitor side transmission unit which transmits control signal to the image-taking apparatus; and
    a manipulation apparatus which modifies the control signal in accordance with manipulation of a monitoring person.

9. The image-taking apparatus according to claim 1, further comprising: a reception unit which receives a control signal; and a controller which controls an amount of image information transmitted by the transmission unit based on the control signal.

10. A monitoring system comprising:
    the image-taking apparatus according to claim 9;
    a monitor apparatus which displays image information transmitted from the transmission unit of the image-taking apparatus;
    a monitor side transmission unit which transmits control signal to the image-taking apparatus; and
    a manipulation apparatus which modifies the control signal in accordance with manipulation of a monitoring person.

11. A monitoring system comprising: the image-taking apparatus according to claim 1; and a monitor apparatus which displays image information transmitted from the transmission unit of the image-taking apparatus.

12. The image-taking apparatus of claim 1, further comprising a hold member which holds the compound eye optical unit and the image-pickup device and includes an attachment member for attachment to a user.

* * * * *